United States Patent
Salmon (10) Patent No.: US 11,074,830 B1
(45) Date of Patent: Jul. 27, 2021

(54) APPARATUS AND METHODS FOR PROVIDING INTERACTIVE PLAY EXPERIENCE

(71) Applicant: Cheekycoo, LLC, Colts Neck, NJ (US)

(72) Inventor: Pamela Salmon, Colts Neck, NJ (US)

(73) Assignee: Cheekycoo, LLC, Colts Neck, NJ (US)

( * ) Notice: Subject to any disclaimer, the term of this patent is extended or adjusted under 35 U.S.C. 154(b) by 0 days.

(21) Appl. No.: 17/081,065

(22) Filed: Oct. 27, 2020

(51) Int. Cl.
| | |
|---|---|
| *A63F 1/00* | (2006.01) |
| *G09B 19/00* | (2006.01) |
| *A63F 11/00* | (2006.01) |
| *A63F 1/04* | (2006.01) |
| *A63F 3/04* | (2006.01) |

(52) U.S. Cl.
CPC ............... *G09B 19/00* (2013.01); *A63F 1/04* (2013.01); *A63F 3/04* (2013.01); *A63F 11/0011* (2013.01); *A63F 3/0478* (2013.01); *A63F 11/0074* (2013.01); *A63F 2001/0475* (2013.01); *A63F 2003/0481* (2013.01); *A63F 2003/0492* (2013.01); *A63F 2011/0016* (2013.01); *A63F 2011/0018* (2013.01); *A63F 2011/0086* (2013.01)

(58) Field of Classification Search
CPC ...... A63F 2011/0018; A63F 2011/0016; A63F 2003/0489; A63F 2003/0481; A63F 2003/0492; A63F 3/0478; A63F 2011/0086; A63F 1/00
USPC .............. 273/429–432, 141 R, 142 R, 142 H, 273/142 HA, 142 J, 142 JA–142 JD, 243, 273/249, 287, 148 A, 302–308
See application file for complete search history.

(56) References Cited

U.S. PATENT DOCUMENTS

| | | | | |
|---|---|---|---|---|
| 4,966,371 A | * | 10/1990 | Sherman ............. | A63F 3/00006 273/146 |
| 5,346,221 A | * | 9/1994 | Gray ................... | A63F 3/00145 273/243 |
| 5,505,456 A | * | 4/1996 | Schmidt ................ | A63F 3/0423 273/272 |
| 7,243,920 B2 | * | 7/2007 | Braun ...................... | A63F 1/10 273/148 A |
| 2005/0023755 A1 | * | 2/2005 | Leshem ................ | A63F 3/0478 273/242 |

FOREIGN PATENT DOCUMENTS

GB       2186497 A  *  8/1987  ............... A63F 9/18

OTHER PUBLICATIONS

Manuel Sprung, et al., Children's emotion understanding: A meta-analysis of training studies, Department of Health and Human Services, Dev Rev. Sep. 1, 2015; 37: 41-65. doi:10.1016/j.dr.2015.05.001, 35 pages.

(Continued)

*Primary Examiner* — Benjamin Layno
(74) *Attorney, Agent, or Firm* — Christopher & Weisberg, P.A.

(57) ABSTRACT

A game for assessing and developing emotional intelligence where the game may comprise: at least one selector configured to indicate one of a plurality of emotions; and a plurality of images wherein each image represents an emotional situation and wherein the one emotion indicated by the at least one selector is assignable to one of the plurality of emotions.

20 Claims, 3 Drawing Sheets

(56) References Cited

OTHER PUBLICATIONS

Stuart Boon, Developing an emotionally literate school, The Bridge: Journal of Educational Research-Informed Practice, vol. 1, Issue 2: Dec. 2014, 38-56, ISSN 2056-6670, 19 pages.
Francisco Pons, et al., Teaching emotion understanding, European Journal of Psychology of Education, Sep. 2002, DOI: 10.1007/BF03173538, pp. 293-304.

* cited by examiner

FIG. 3

APPARATUS AND METHODS FOR PROVIDING INTERACTIVE PLAY EXPERIENCE

CROSS-REFERENCE TO RELATED APPLICATION n/a

FIELD

The present invention is generally related to a game to educate players about emotions where the user interacts with the game to introduce various emotions and associate different emotions with different indicia, activities, and/or actions.

BACKGROUND

As people grow and develop, they learn and acquire skills and information at different rates and in different ways. One area of growth and development involves social and emotional development and awareness. How each individual develops socially and emotionally is based upon a variety of different factors. These factors can include each person's own experiences, what they observe, how they are treated, and how and what areas are reinforced. People's social and emotional development occurs at different times, at different rates, and in different ways.

Emotional and social intelligence also varies in each person and continues to develop and change as a person grows and matures. For example, some areas of emotional development include developing emotional awareness which includes feeling an individual's own feelings as well as recognizing emotions in others. Also, a person can learn to recognize what a feeling is, how body language, the voice, and facial expressions may play a part in emotions. Another area of emotional development is where a person learns to describe feelings and with developing the vocabulary of how to explain feelings along with empathizing with what others are feeling. Learning how to control and manage emotions, understanding what causes feeling, understanding the connection between emotions and behavior are all part of emotional learning and development.

As people continue to develop and grow emotionally, this development can help them adapt and cope with a variety of different emotions and situations that they may experience as well as the emotions of others. People learn and develop self-expression of emotions, listen to others, and help others by responding in emotionally appropriate ways, and by processing and dealing with different emotions.

Understanding emotions can help people understand themselves and others. Also, it can help people communicate and manage feelings to help with the development and maintenance of different types of relationships.

There are many ways of teaching emotional intelligence and games can be used to teach and reinforce social and emotional learning skills. This can help people develop relationships, develop self-awareness, make decisions, resolve issues, develop self-control, and resolve conflicts. Sometimes educators are busy teaching the pre-determined curriculum that does not involve social and emotional intelligence that this skillset can sometimes be left behind. There are ways for people to develop social and emotional skills that can be meaningful, interactive, hands-on, and engaging.

SUMMARY

The techniques of this disclosure generally relate to educational games to educate players about emotions and emotional intelligence where the user interacts with the game to associate different emotions with different activities and/or actions.

In one aspect, the present disclosure provides a game for assessing and developing emotional intelligence comprising: at least one selector configured to indicate one of a plurality of emotions; and a plurality of images wherein each image represents an emotional situation and wherein the one emotion indicated by the at least one selector is assignable to one of the plurality of emotions.

In another aspect, the at least one selector is configured to be activated to randomly correspond to an emotion.

In another aspect, the at least one selector is at least one from the group consisting of a spinner, a stopwatch, a wheel, a die, a block, and a random electronic generator.

In another aspect, the at least one selector is a spinner.

In another aspect, the at least one selector is six spinners.

In another aspect, each spinner has a plurality of colors, each color being configured to correspond to the at least one emotion.

In another aspect, the plurality of colors are red, yellow, green and blue and each spinner includes the plurality of colors.

In another aspect, the game further comprises a gameboard, the gameboard being configured to releasably receive the at least six spinners.

In another aspect, the gameboard is an anthropomorphic shape.

In another aspect, the game further comprises at least one retaining mechanism, the at least one retaining mechanism being configured to retain the plurality of images.

In another aspect, the game further comprises two retaining mechanisms, the gameboard being configured to receive the two retaining mechanisms.

In another aspect, the game further comprises at least two holders, the at least two holders being configured to receive the plurality of images.

In another aspect, each holder includes a plurality of slots, each slot being configured to releasably retain at least one image from the plurality of images.

In another aspect, each holder includes at least twenty-four slots.

In another aspect, the gameboard is configured to receive the at least two holders.

In another aspect, each image from the plurality of images is secured to at least one from the group consisting of a card, a chip, a coin, a playing piece, and a tile.

In another aspect, each image from the plurality of images is secured to a card.

In another aspect, the plurality of emotions includes at least one from the group consisting of relaxed, happy, sad, and angry.

In one aspect, a game for assessing and developing emotional intelligence comprises: a gameboard having an anthropomorphic shape; at least six spinners, each spinner having a plurality of colors wherein each color is configured to correspond to at least one emotion, the plurality of colors including red, blue, yellow and green, each spinner being configured to be activated to randomly correspond to an emotion, each spinner being configured to be releasably secured to the gameboard; a plurality of images where each image is secured to a card and each image represents an emotional situation and the one emotion indicated by each spinner is assignable to one of the plurality of emotions; at least one retaining mechanism, the gameboard being configured to receive the two retaining mechanisms, each retaining mechanism being sized to receive the plurality of images; and at least two holders, each holder including a plurality of slots, each slot being configured to releasably retain at least one image from the plurality of images.

In one aspect, a method of stimulating conversation about at least one emotion comprises: asking a persons to identify at least one emotion; providing an indicia corresponding to the at least one emotion; discussing the at least one emotion; and performing an assessment of the at least one emotion.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 1:
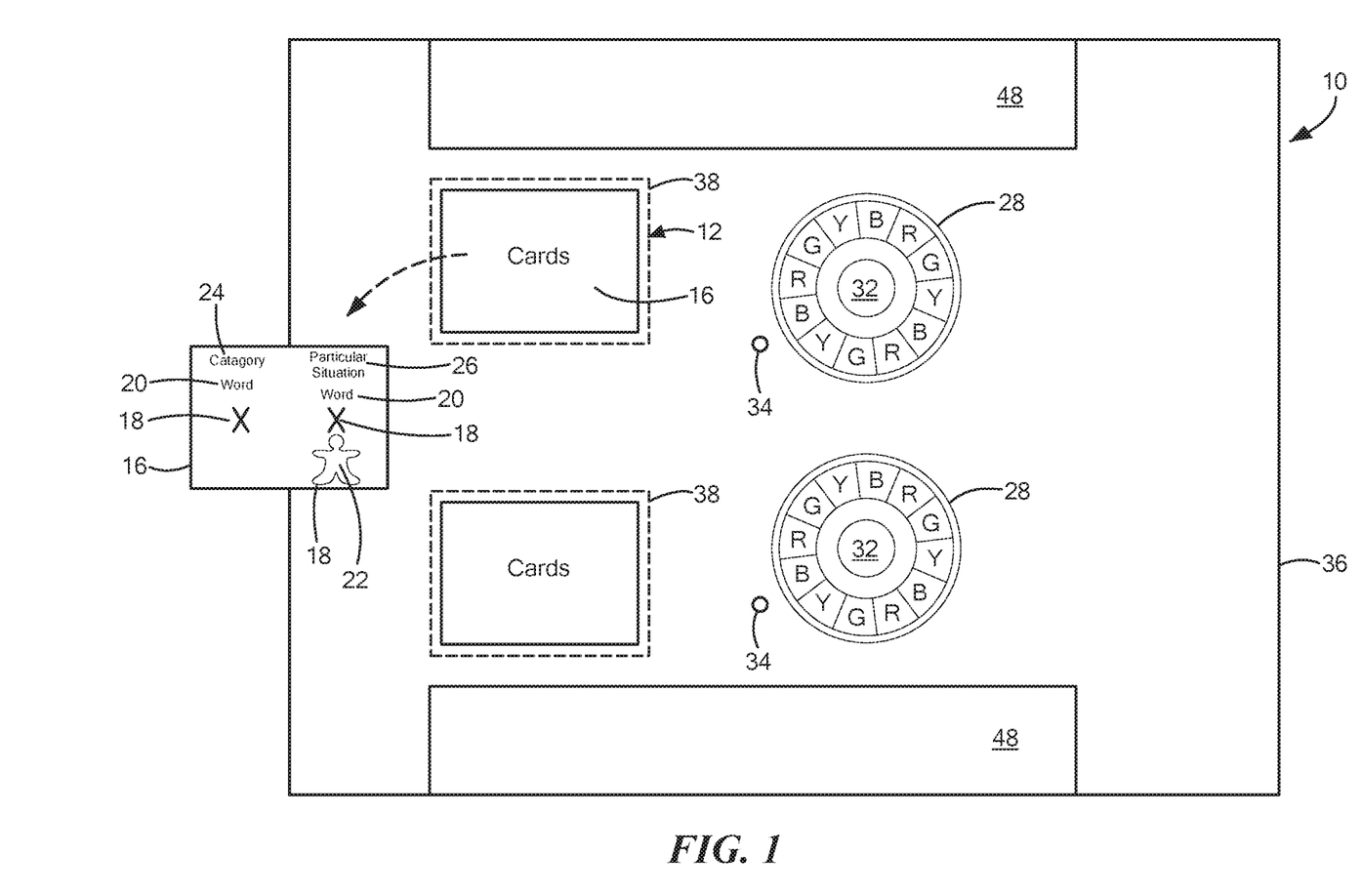
FIG. 1 is an exemplary embodiment of the game for developing emotional intelligence.

Referring now to the drawings, and in particular to FIG. 1, the game 10 may be used to assess and/or develop emotional intelligence. Throughout this application, it will be understood that when reference is made to an emotion, this also encompasses feelings, mental states, and/or mental experiences as well. Generally, an emotion is defined as "a conscious mental reaction (such as anger or fear) subjectively experienced as strong feeling usually directed toward a specific object and typically accompanied by physiological and behavioral changes in the body; a state of feeling; the affective aspect of consciousness." See https://www.merriam-webster.com/dictionary/emotion. Generally, a feeling is defined as "generalized bodily consciousness or sensation; appreciative or responsive awareness or recognition; an emotional state or reaction; susceptibility to impression; the undifferentiated background of one's awareness considered apart from any identifiable sensation, perception, or thought; the overall quality of one's awareness; conscious recognition; capacity to respond emotionally especially with the higher emotions" See https://www.merriam-webster/dictionary/feeling. A mental state of generally defined as "a mental condition in which the qualities of a state are relatively constant even though the state itself may be dynamic." See https://www.vocabulary.com/dictionary/mental%20state. Mental experiences are generally defined as "involv[ing] the aspect of intellect and consciousness experienced as combinations of thought, perception, memory, emotion, will, and imagination, including all unconscious cognitive processes. The term can refer, by implication, to a thought process." See https://en.wikipedia.org/wiki/Experience#:-:text=Mental%20experience%20involves%20the%20aspecting.implication%2C%20to%20thought%20process. Accordingly, when reference si made to an emotion throughout the application, this will encompass an emotion, feeling, mental state, and/or mental experience.

Continuing to refer to FIG. 1, the game 10 may include at least one image or a plurality of images 12. When reference is made to the images in this application it will be understood this may be at least one image 12 or the plurality of images 12. Each image in the plurality of images 12 may represent at least one emotion and/or at least one situation that may evoke, signal, indicate, and/or cause an emotional response 14. The at least one emotion 14 may include, but is not limited to happy, relaxed, sad, anger, joy, trust, and sorrow. The plurality of images 12 may be secured to a card, a doll, a figurine, a stuffed animal, a sticker, a book, a chip, a coin, a playing piece, a tile, or any other item that is sized to hold the image 12. In the exemplary embodiment, as shown in FIG. 1, the plurality of images 12 are shown secured to a card 16. Each card 16 may include one image 12 or more than one image 12. It will be understood that while reference is made with respect to the plurality of images 12 being secured to the card 16, the plurality of images 12 may also be secured to any item that can hold the image 12 and be used by a player in a similar manner. The one image 12 or more than one image 12 may be at least one drawing, design, picture, and/or photograph 18, at least one word 20, and/or at least one color 22. Each card 16 may have one image 12 or more than one image 12 on each card 16. For example, the card may include one drawing 18, one word 20, and one color 22. The at least one drawing, picture, design and/or photograph 18, the at least one word 20, and/or the at least one color 22 may each be tied to signal, evoke, indicate and/or cause a person to feel a particular emotion 14 or more than one emotion 14 and therefore each card 16 may be used to represent one emotion 14 or more than one emotion 14. Using the combination of at least one drawing, design, picture, and/or photograph 18, the at least one word 20, and/or the at least one color 22 may allow someone who cannot read but knows their colors to participate in the game 10 as well as to learn to associate different colors and words with different feelings. Also, using these types of images 12 may allow individuals who do not speak with same language or are not as familiar with the language used in the game 10 to participate and play the game 10. The cards 16 may also have a plurality of images 12 including brail and/or audible images 12 to allow someone who cannot see and/or read the ability to participate in the game 10. Structuring the game with different images 12 that correspond to emotions 14 may allow people with a variety of different abilities to participate in the game 10 including individuals who may be color-blind, unable to read, unable to speak with same language, and/or unable to hear. Each card 16 may have any variety of the plurality of images 12 on each card and the game may be customized based upon the particular players that are engaging in the game 10.

The game 10 may include hardware, software, firmware, or any combination thereof along with processing circuitry so that the game 10 may be programmable to include audible sounds including reciting words 20 in different languages and to audible sounds that discuss the images 12, for example on the card 16, in one language ore more than one language. The processing circuitry may be configured to execute instructions or algorithms to provide for the automated operation and performance of the features, sequences, calculations, or procedures described herein. The processing circuitry may include a processor and memory. The memory may be in electrical communication with the processor and have instructions that, when executed by the processor, configure the processor to receive, process, or otherwise use signals from the game 10. Further, the game 10 may include one or more user input devices, controllers and/or a display for collecting and conveying information from the to the player and/or anyone participating in the game.

In one exemplary embodiment, each card 16 may have a category 24 and each category 24 may refer to a general situation. These general situations may be relatable to many people in their daily lives. For example, each category 24 may correspond to various situations including: the beach, children, a spouse, clothing, neighbors, friends, working, school, stores, shopping, exercising, swimming, playing, playing a game, eating, coloring, arts and crafts, learning, baking and/or cooking, writing, going to an amusement park, gardening, going to a movie, playing, and/or going to a show, lemonade stand, driving, riding a train, studying, exams, dancing, going on vacation, visiting a museum, riding on an airplane, going to a restaurant, exploring, bathing, having a garage sale, puzzles, taking pictures, getting sick, boating, visiting the hospital and/or doctor, reading, listening to music, making clothing, playing on the computer/tablet, watching television, watching the clouds and/or stars, a scavenger hunt, cleaning and/or doing chores, as well as a variety of other situations that an individual may experience in life. This list is meant as a non-exhaustive list of different situations that an individual may find himself and/or herself in at some point in life any may be able to relate to in the game 10. Each category 24 may evoke a variety of different emotions depending upon the individual's experience within each category 24. In one embodiment, each category 24 may be represented on the card 16 with a drawing, picture, and/or photograph 18, and/or at least one word 20. For example, the category 24 may be clothing, and the clothing may be shown as a drawing of clothing in the closet along with the word clothing.

The card 16 may also have a particular situation 26 within the category 24 where the particular situation 26 within the category 24 is tied to at least one emotion 14. As a non-limiting example, if the category 24 may be "friends" and the particular situation 26 within the category 24 may be "friends have a sick puppy" and the at least one emotion 14 may be sad which is tied to the particular situation 26 within the category 24. It will be understood that any variety of particular situations 26 may be used within each category 24 to evoke a variety of different emotions 14. The game 10 may be customized with particular situations 26 within each category 24 so that the categories 24 and the particular situations 26 relate to the particular people playing the game 10 or the particular situations 26 within each category 24 may be generally created for the game 10. When the particular situations 26 within each category 24 are customized, they may be helpful in a medical setting for assessing, introducing, familiarizing, and teaching a person about emotional intelligence and emotions generally. The particular situation 26, in one embodiment, may be represented by at least one drawing, picture and/or photograph 18 and at least one word 20. In the particular situation 26 "friends have a sick puppy" within the category 24 "friends" the card 16 may have a drawing of a puppy with a bandage with the words "friends have a sick puppy" along with another image that is someway related to the emotion 14 of being "sad". In one embodiment, the at least one emotion 14 may be shown with an image of an anthropomorphic character with the word "sad" near the anthropomorphic character. Additionally, the anthropomorphic character may be at least one color 22 that is tied with the particular emotion 14. For example, the image of an anthropomorphic character with the word "sad" may have the anthropomorphic character in a blue color.

The at least one color 22 that is used to represent the at least one emotion 14 may be any variety of different colors associated with a variety of different emotions. In one exemplary embodiment, the colors may be red to correspond to angry and/or scared, blue to correspond with sad and/or remorseful, green to correspond with peaceful and/or relaxed, and yellow to correspond with joyful and/or happy. It will be understood that any variety of different color and/or color combinations may be used to correspond with each emotion and more than one color may be used to signal a particular emotion as well. Additionally, each color in the at least one color 22 may be made lighter and/or darker. For example, each color in the at least one color 22 may be made more intense to indicate that someone is feeling an emotion 14 intensely or each color in the at least one color 22 may be made less intense to indicate that someone is feeling an emotion 14 less intensely.

The game 10 may further include at least one selector 28. It will be understood that the at least one selector 28 may be one selector 28 or more than one selector 28. The at least one selector 28 may be able to indicate different emotions 14. Also, the at least one selector 28 may be configured to be activated to randomly correspond to the at least one emotion/emotional situation 14. For example, the at least one selector 28 may be a spinner, a stopwatch, a wheel, a die, a block, a random electronic generator, or another selector that can randomly select the at least one emotional situation 14. As shown in the exemplary embodiment in FIG. 1, the game 10 may include two selectors 28. Each selector 28 may be able to indicate at least one of a plurality of emotions 14. For example, in FIG. 1, the selector 28 may be a spinner 30 and the spinner 30 may have at least one color 22 configured to correspond to a particular emotion and the same emotion may be displayed and/or shown on the card 16. In one embodiment, the spinner 30 may have a circular shape and have a plurality of colors around at least the perimeter of the spinner 30. For example, the spinner 30 may include the colors red, blue, green, and yellow in repeating patterns around the spinner 30 as shown in FIG. 1 where red is "R", blue is "B", green is "G", and yellow is "Y". The colors around the perimeter of the spinner 30 may be in repeating patterns and each color may have an equal size and/or shape around the perimeter or some of the colors around the perimeter of the spinner 30 may have larger sizes and/or shapes than other colors. The movement of the spinner 30 in a circle may represent how emotions 14 are always moving and changing like the movement of the colors on the spinner. The spinner 30 may have a protrusion 32 and in the exemplary embodiment of the spinner 30 shown in FIG. 1, the protrusion 32 may be in the center of the spinner 30 and may be used to initiate the rotation of the spinner 30. When a player spins the spinner 30 the spinner 30 may light up various colors 22 as the spinner 30 spins and then when the spinner 30 stops spinning, one color 22 on the spinner 30 may remain lit to correspond with the color 22 that the spinner 30 lands on in the given spin by the player. The spinner 30 may also have at least one indicator 34 and the at least one indicator 34 may be used to indicate which color the spinner 30 actually lands on. In the exemplary embodiment, the spinner 30 may have one indicator 34 and the indicator 34 may be a round knob or another shape that is located proximate the spinner 30. When the spinner 30 stops spinning, the color that is proximate the indicator 34 may correspond to the color that the spinner 30 has landed on after a given spin by the player.

The game 10 may also include a gameboard 36 and the gameboard may be a variety of different shapes and sizes. The gameboard 36 may be sized to receive the at least one selector 28 and the plurality of images 12. In the exemplary embodiment as shown in FIG. 1, the gameboard 36 may have at least one retaining mechanism 38 that is configured to retain the plurality of images 12. The at least one retaining mechanism 38 may be an indentation in the gameboard 36 that is sized to secure the plurality of images 12 to the gameboard 36. Alternatively, the at least one retaining mechanism 38 may be raised portions that are raised vertically from the gameboard 36 and sized to receive the plurality of images 12. In one embodiment, the at least one retaining mechanism 38 may be an indentation in the shape of a square that is sized to receive the cards 16. As shown in FIG. 1, the gameboard 36 may have two separate retaining mechanisms 38 that are each sized to receive at least one card 16. The at least one selector 28 may also be releasably or permanently secured to the gameboard 36 using a variety of different securing mechanisms. For example, the at least one selector 28 may be secured to the gameboard 36 magnetically, with a tack, a nail, a hook and loop fastener, using string through the at least one selector 28. The gameboard 36 may also have a projection 40 as shown in FIG. 1. The projection 40 may have a first end 42 and a second end 44 opposite the first end 42. The first end 42 of the projection 40 may be secured to a portion of the gameboard 36 and the second end 44 of the projection 40 may extend a distance away from the gameboard 36 and be sized to receive the at least one selector 28. The second end 44 of the projection 40 may receive the selector 28 and a portion of the gameboard 36 may also have an indentation 46 that is sized and shaped to receive the at least one selector 28. The second end 44 of the projection 40 may be rounded and smooth so that the at least one selector 28 can be safely placed on the projection 40 and easily removed from the projection 40 without injuring the user. The use of the projection 40 as well as the indentation 46 on the gameboard 36 to receive each selector 28 may releasably secure each spinner 30 to the gameboard 36 so that the spinner 30 can be easily placed on the gameboard 36 and removed from the gameboard 36. In one embodiment, the projection 40 may be an elongated structure that is sized to receive the spinner 30 and releasably secure the spinner 30 to the gameboard 36 while the spinner 30 is being spun. When the spinner 30 is secured to the gameboard 36 with the projection 40, the spinner 30 may freely rotate and movement of the spinner in a circle may not be impeded by the projection 40.

Continuing to refer to FIG. 1, the game 10 may also include at least one holder 48. As shown in the embodiment in FIG. 1, the game 10 may have two holders 48 and each holder 48 may be part of the gameboard 36 or may be entirely separate from the gameboard 36. The gameboard 36 may be sized to releasably retain each holder 48 and/or each holder 48 may be permanently secured to the gameboard 36 by for example, being integrated into the gameboard 36. Each holder 48 may be sized to receive a plurality of images 12. For example, the player of the game 10 may place the plurality of images 12 in or on the holder 48 or the holder 48 may include a plurality of slots 50 and the plurality of slots 50 may be sized to receive the plurality of images 12. In one exemplary embodiment, each slot 50 from the plurality of slots 50 may be sized to receive and to releasably retain at least one card 16 and using the plurality of slots 50 may help each player organize and keep track of each card. The number of holders 48 used with the game 10 may be based upon the number of players playing and each player may receive one holder 48.

Figure 2:
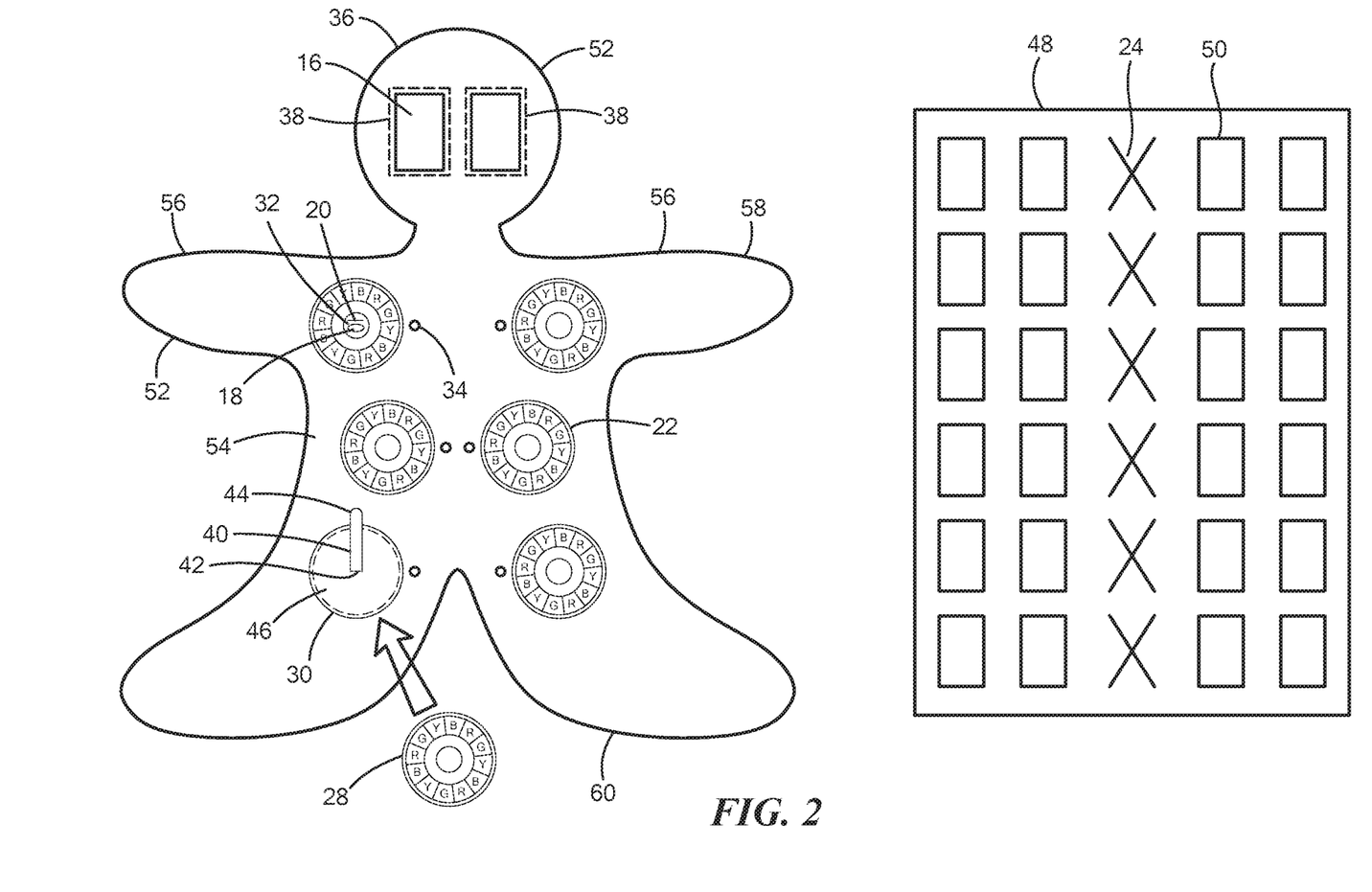
FIG. 2 is an exemplary embodiment of the game for developing emotional intelligence.

Now referring to FIG. 2, another exemplary embodiment of the game 10 having the gameboard 36 where the gameboard 36 involves an anthropomorphic shape. In the exemplary embodiment as shown in FIG. 2, the gameboard 36 is in a roughly humanoid shape with stubby feet and no fingers and may be considered to be in the shape of a gingerbread man. The gameboard 36 may include a head 52, a torso 54, and a plurality of appendages 56. The plurality of appendages 56 may include the neck, the arms, the legs, or any other part of the body that projects from the torso 54. In one embodiment, the plurality of appendages 56 may include at least one arm 58 and at least one leg 60. As shown in FIG. 2, the plurality of appendages 56 includes two arms 58 and two legs 60. The use of a roughly humanoid shape for the gameboard 36 can allow people playing the game the experience of associating each of the emotions that are part of game 10 with the person, animal, or thing that the roughly humanoid shape of the gameboard 36 reminds the player of. For example, the roughly humanoid shape may allow the user to associate the emotions in the game 10 with a particular person, personkind in general, the player, a gingerbread man, an animal, a doll, and/or a toy and this association may assist the person in experiencing, understanding, and moving through the emotion. This can also help the player with empathy, building emotional intelligence, and associating different emotions with others.

Continuing to refer to FIG. 2, the gameboard 36 may also include two retaining mechanisms 38 that are indentations in the gameboard 36 and sized to receive the cards 16 that are part of the game 10. The gameboard 36 can have any number of retaining mechanisms 38 and may not have any retaining mechanisms 38 such that the cards are not received or retained within the gameboard 36. The two retaining mechanisms 38 may be part of the head 52 of the gameboard 36 and be placed on the gameboard 36 to resemble the eyes of the roughly humanoid shaped gameboard 36. The gameboard 36 may also include six spinners 30 where four of the spinners 30 are located in the torso 54 of the gameboard 36 and two of the spinners are located in the legs 60 of the gameboard 36. However, the location of each spinner 30 and the number of spinners 30 may be in any shape and/or configuration. Each spinner 30 may have one indicator 34 and the at least one indicator 34 may be a knub, a square, or any other shape on the gameboard 36 which is sized to correspond with one color of the at least one color 22 on the spinner 30. For example, as shown in FIG. 2, the spinner 30 may have a repeating pattern of colors including the following blue, red, green, yellow, blue, red, green, yellow, and blue, red, green, and yellow. The indicator 34 may be sized to correspond with one color on the spinner 30 where each color 22 is a triangular shape, a quadrilateral shape, or any other shape on the spinner 30. In the exemplary embodiment in FIG. 2, each color 22 is the same size and shape on the spinner 30 and each color 22 may be separated by a divider 62 on the spinner 30. Each divider 62 may be uniformly shaped and sized on the spinner 30 or the dividers 62 may have different sizes and shapes on the spinner 30. For example, each spinner 30 may have twelve dividers 62 to separate each color 22 on the spinner 30. The spinners 30 may have dividers 62 that are uniformly spaced a distance apart so that each color 22 on the spinner 30 has an equal chance of being activated on the spinner 30.

The protrusion 32 that may be on the spinner 30 may also have at least one drawing, picture, and/or photograph 18 and at least one word 20. For example, the game 10 may include six separate categories 24 where the categories include: friends, children, clothes, the beach, husband, and neighbors. Each spinner 30 may include one of the categories 24 and the category 24 may be identified on the protrusion 32 of the spinner 30. The protrusion 32 may have a smooth portion such that a drawing 18 of the category 24 as well as a word 20 identification of the category 24 can be visible on the protrusion 32. In one exemplary embodiment, the protrusion 32 may include a picture of the beach as well as the words "THE BEACH." The cards 16 may also be configured to correspond to each of the six categories 24 such that there are four cards within the category 24 of the beach. Each card 16 may include the category 24 in words 20 as well as the picture of the beach which is the same picture of the beach that is on the at least one protrusion 32. This may assist the players in identifying which spinner 30 is associated with certain categories 24. The card 16 may also include something that is happening at the beach like "me time" with a picture of a person sitting in a chair at the beach along with a drawing in the shape of the gameboard 36 with the drawing being filled in with one color 22, like a green for being relaxed and the word "relaxed" may be near the drawing in the shape of the gameboard 36. The green on the card 16 may correspond to the green on the spinner 30 and the spinner 30 with the protrusion 32 having the drawing 18 of the category 24 of the beach as well as the words "the beach" on the spinner 30. The spinner 30 that has the same category 24 that can be found on the selected card 16 may be the spinner 30 that is used by the player when any of the cards 16 having the beach category 24 are selected.

In one embodiment, each category 24, like the beach, may have four different cards that relate to the category 24 and each card 16 may describe one emotion 14 and one color 22 associated with that emotion 14. The four cards 16 relating to category 24 of the beach may include the words 20 "THE BEACH" as well as the picture of the beach which is the same picture of the beach that is on the at least one protrusion 32 and all the corresponding cards 16 for the beach. The card 16 may include "the sun smiling" on the beach with a picture of the smiling sun, the words "the sun smiling", along with the drawing in the shape of the gameboard 36. The drawing in the shape of the gameboard 36 may be filled in with one color, like a yellow for being happy, and the word "happy" may be close to the drawing in the shape of the gameboard 36. The yellow on the card 16 may correspond to the yellow on the spinner 30 and the spinner 30 with the protrusion 32 relating to the category 24 of the beach on the spinner 30. The card 16 may also include that "the beach is closed until next summer" with a drawing of the beach being closed, the words "beach closed", along with the drawing in the shape of the gameboard 36. The drawing in the shape of the gameboard 36 may be filled in with one color, like a blue for being sad, and the word "sad." The blue on the card 16 may correspond to the blue on the spinner 30 and the spinner 30 with the protrusion 32 relating to the category 24 of the beach on the spinner 30. The card 16 may also include "I don't want to leave" with a drawing showing a person that does not want to leave the beach along with the drawing in the shape of the gameboard 36. The drawing in the shape of the gameboard 36 may be filled in with one color, like a red for being angry, and the word "angry." The red on the card 16 may correspond to the red on the spinner 30 and the spinner 30 with the protrusion 32 relating to the category 24 of the beach on the spinner 30. In one exemplary embodiment, each of the six different categories 24 may include the emotions of angry, happy, relaxed, and sad, along with the corresponding colors 22 relating to each emotion 14. The cards 16 in one exemplary embodiment may also include a "lose a turn" card where the player loses a turn if the "lose a turn" card 16 is selected from the cards 16.

The gameboard 36 may also have various electronics to engage the player. For example, the spinner 30 may play music and/or make an audible sound when the player spins the spinner 30 or when the spinner 30 lands on a particular color. Also, the spinner 30 may light up when it spins and the color 22 that is lit when the spinner 30 stops spinning may be the color 22 that the players lands on for the given spin. The spinner 30 may also have various audible sounds associated with each emotion 14 so that the player may hear various sounds as the spinner 30 spins as well as a particular sound when the spinner 30 lands on the emotion 14. The gameboard 36 may also be equipped to produce audible words as the player spins the spinner 30 such that while the spinner 30 is spinning the gameboard 36 may state the emotions 14 orally to familiarize the players with all the emotions 14. Hearing and familiarizing people with the emotions 14 can and make them easier to discuss and understand. The gameboard 36 may also be configured such that the player uses his or her hands to spin the spinner 30 or alternatively may press a button and the spinner 30 may spin and land on a particular color 22 or the spinning of the spinner 30 may also be initiated by a command or another way. The at least one retaining mechanism 38 may also light up when a card is removed from and/or placed within the retaining mechanism 38. The retaining mechanism 38 may also make an audible sound relating to the cards 16 as well. Any portion of the gameboard 36 may include lights, sounds, and/or vibrations.

Continuing to refer to FIG. 2, the game 10 may include at least one holder 48 for each player. In one embodiment, the game 10 may include four holders 48 and each older may be in the shape of a square with each side being between approximately 10-50 inches in length. The at least one holder 48 may include a plurality of slots 50 where each slot is configured to retain at least one image from the plurality of images 12. For example, each slot 50 may be sized to receive at least one card 16 to help the player organize and understand the cards 16. For example, each holder 48 may include the drawing, pictures and/or photograph 18 from each category 24 as well as the words 20 describing the category 24. In one embodiment, the holder 48 may include the drawing, picture and/or photograph from one particular category 24 along with the words 20 describing the category 24 along with four corresponding slots 50 for each of the cards 16 that correspond to the one category 24. Each slot 50 may be labeled with the emotions 14 that can be found in each category 24 of cards 16. For example, each slot 50 may be labeled with one of angry, sad, happy, and relaxed along with the corresponding color 22 for each category 24 and there may be the image as well as words that correspond to one category 24 and the four emotions in that particular category. In the embodiment as shown in FIG. 2, the holder 48 includes six different categories 24 and there are four slots 50 corresponding to each category 24. Accordingly, in one embodiment the holder 48 includes twenty-four separate slots 50 and along with the image as well as words that correspond to one category 24. Each player of the game would have one holder 48 along with the twenty-four separate slots 50 and the image as well as words that correspond to one category 24.

Figure 3:
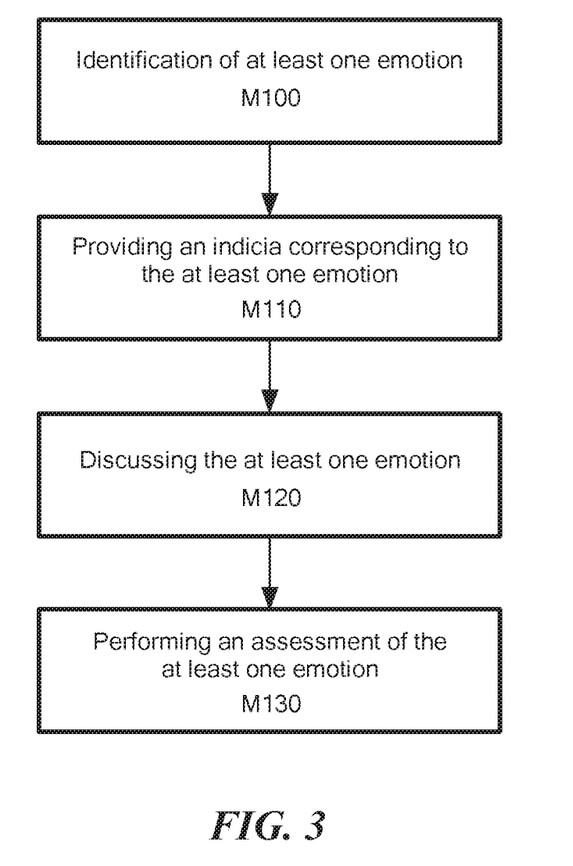
FIG. 3 is an exemplary method for stimulating conversation about at least one emotion.

One exemplary method of playing the game as shown in the embodiment in FIG. 3 may include the game 10 for assessing and developing emotional intelligence. This exemplary method relating to the game 10 may include stimulating conversation and/or discussion about emotions while also assessing and developing emotional intelligence. One person may ask another person questions including the identification of at least one emotion 14. M100. This may involve the identification of one emotion or more than one emotion 14. The person responding to the questions may be given a doll, toy, or another object and this object may make it more comfortable to talk about emotions 14 and the person responding to the questions may direct any responses to the object as well. Once at least one emotion 14 is identified, an indicia corresponding to the at least one emotion 14 may be provided. M110. The indicia corresponding to the at least one emotion 14 may include the card 16, the gameboard 36, a doll, a figurine, a stuffed animal, a sticker, a book, a chip, a coin, a playing piece, a tile, or another object that corresponds to the at least one emotion 14. Also, the at least one indicia may include particular objects that evoke a particular emotional response in an individual and/or may be generalized objects that are generally known to evoke specific emotional responses. Alternatively, the at least one indicia may be an object that does not necessarily correspond to any particular emotions 14. Also, the indicia may include a calibrated energetic value that corresponds to particular emotions. The calibrated energetic value may be generally calculated to correspond to a particular emotion and/or may be randomly selected to correspond to a particular emotion. Generally, the indicia may be used to initiate conversation and discussion about the at least one emotion 14 or there may generally be discussion about the at least one emotion 14. M120. Certain objects may trigger certain emotions in an individual that are person specific and the determination of what indicia to use may be the same each time or may be customized for the individuals participating. For example, if the individual responding to the questions has experienced a traumatic experience, certain indicia may be used to trigger particular emotions so that the person can talk about the emotion and this type of discussion and/or recognition of the feeling may help the person move through the feeling as well. During the discussion or following the discussion of the at least one emotion 14 there may be an assessment performed of the at least one emotion 14. M130. This assessment may be generally related to the at least one emotion 14 or it may be specific to the at least one emotion 14. M130. Also, the assessment may be related to one person or a group of persons related to the at least one emotion 14. This assessment may be used to help develop emotional intelligence and to help with understanding emotions, moving through emotions, and/or dealing with emotions.

In another exemplary method relating to playing the game 10, the players of the game may obtain the cards 16 that are associated with the game 10. In one embodiment of the game 10, there may be twenty-six total playing cards. Two of the cards 16 may be "lose a turn" cards 16 and the remaining twenty-four cards 16 may be cards 16 associated with various emotions 14. One side of the "lose a turn" card 16 may include the words 20 "lose a turn" and the second side of the card 16 may have a generic image that is used on all the cards 16 so that any player cannot identify what is on the other side of the card 16 when viewing the generic image on the one side. For example, on one side of each card 16 there may be one of the six categories 24 and the six different categories 24 may include "the beach", "neighbors", "husband", "clothes", "children", and "friends". Each single category 24 may be associated with four different emotions 14. For example, in the category 24 of "children" there may be four different cards 16 where each card 16 includes one of the following emotions 14: relaxed, happy, sad, and angry. Each of the other remaining categories 24 (i.e. the beach, neighbors, husband, clothes, and friends) may also include the same emotions 14 of relaxed, happy, sad, and angry. The card 16 may express and/or show the emotion 14 with drawings 18, words 20, and/or at least one color 22. In one exemplary card 16, on one side of the card the left portion of the card 16 may have a drawing 18 with two children and the word "children" above the drawing 18. The right portion of the card 16 may including a drawing 18 of the two children practicing yoga, the word 20 "yoga", and below the drawing 18 of the two children practicing yoga may be the roughly humanoid shape drawing 18 with hair, eyes, a mouth, a bowtie, and buttons in the color 22 green with the word 20 "relaxed" below the drawing 18 with the roughly humanoid shape. The second side of the card 16 may have the generic image that is used on all the cards 16 so that any player cannot identify what is on the other side of the card 16 when playing the game. The cards 16 may be shuffled, arranged, and/or organized in any manner so that any player that is participating in the game 10 can select a random card 16 that is in no particular order.

Each card 16 in the game may be placed face down so that the words 20, drawings, pictures, and/or photographs 18, the colors 22, and the category 24 are not visible to the players and instead the only visible side of the card 16 is the second side of the card 16 with the generic image that is used on all the cards 16. The cards 16 may be placed on the gameboard 36. In one embodiment, the gameboard 36 may have the roughly humanoid shape and the roughly humanoid shape may also be the same and/or similar to the roughly humanoid shape that is on the cards 16. The gameboard 36 may have two retaining mechanisms 38 where the eyes would be located on the roughly humanoid shape and the cards 16 may be placed face down so the only visible side of the card 16 is the second side of the card 16 that has the generic image that is used on all the cards 16. The cards 16 may be placed into one of the retaining mechanisms 38 at the beginning of the game after the cards 16 are randomly shuffled and/or organized.

One exemplary embodiment of the game 10 may also include six spinners 30. Each spinner may have at least one color 22 and, for example, the spinner 30 may have the colors red, blue, green, and yellow in repeating patterns around the spinner 30 as shown in FIGS. 1 and 2 where red is "R", blue is "B", green is "G", and yellow is "Y". The colors around the perimeter of the spinner 30 in repeating patterns may be in equal sizes around the perimeter. In one embodiment, the spinner 30 may have the colors red, blue, green, and yellow repeating in that order around the perimeter of the spinner 30. The gameboard 36 may have six indentations 46 on the gameboard 36 and each indentation 46 may include one projection 40. The size and shape of each indentation 46 is configured to correspond with the size and shape of each spinner 30. Each of the six indentations 46 may have a uniform size and shape or may be differently sized and shaped. For example, as shown in FIG. 2, each indentation 46 may have a circular shape and in the center of each circle may include the projection 40. Each spinner 30 may be placed on the second end 44 of the projection 40 and pushed in down toward the first end 42 of the projection 40 which may be secured to the gameboard 36. Once the spinner 30 is placed on the projection 40, the indentation 46 may help further secure each spinner 30 in place. Each spinner 30 may include the protrusion 32 and each protrusion 32 may have a drawing, picture, and/or photograph 18 as well words 20 that correspond to the one of the six different categories 24. Each spinner 30 may also have at least one indicator 34 and the at least one indicator 34 may be used to indicate which color the spinner 30 actually lands on after being spun by the player.

The game 10 is configured to have two or more players. Each player of the game 10 may have his or her own holder 48. In one configuration, each holder 48 may include a plurality of slots 50 and each slot 50 may correspond to one card 16 in the game 10. For example, the holder 48 may include a drawing, pictures and/or photograph 18 from each category 24 along four slots 50, one slot 50 for each emotion 14 in the particular category 24. Each slot 50 may be labeled or identified in some way to correspond with one of the four emotions 14 in the game. Each slot 50 may include one word 20 that corresponds with one emotion 14. For example, the each of the four slots 50 in one category 24 may be labeled with one word 20 and one emotion 14. For example, the category 24 may be "children" and the emotions 14 may be labeled with the words 20 angry, sad, happy, and relaxed, along with the color 22 that corresponds with each emotion 14 red, blue, yellow, and/or green. Alternatively, each slot 50 may not be labeled and the player can place the cards 16 in any slot.

The youngest player in the game 10 may go first in the game 10 and take the card 16 that is on the top of any card 16 pile. The player will view the card 16 and match the category 24 on the card 16 with the spinner 30 that has the same category 24 on the protrusion 32. The selection of the card 16 will introduce the emotion 14 on the card to the player which can provoke discussion and thought about the emotion 14. This can help those involved in the game acknowledge, discuss, and share emotions 14, including emotions that may be scary and/or uncomfortable, and have fun moving through the particular emotion 14 as the player plays the game 10. The players may be curious about emotions 14 and want to discuss more about the emotion 14, explore the emotion 14, learn emotional intelligence, and build a unique authentic self as the players learn about their emotions 14. The player will spin the spinner 30 with the same category 24 as the selected card 16 and to try and match the color 22 on the card 16 with the color 22 that the spinner 30 lands on. Once the spinner 30 stops moving after being spun by the player, the player will look at the indicator 34 to determine which color 22 the spinner 30 has landed on. If the player lands the spinner 30 on the same color 22 that is on the selected card 16, this would be considered a match and the player will keep the card 16 and place the card 16 in the corresponding slot 50 on the holder 48. The player may have one spin on the spinner 30 to try and match the color 22 on the card 16 with the color 22 on the spinner 30 or the player may have more than one spin in the turn to try and win the spinner 30. If the player lands between the colors 22 on the spinner 30, for example if the player lands on a divider between the colors, then the player may either "lose a turn" or alternatively the player may get the spin the spinner 30 again. In one embodiment, the player may have the opportunity to spin the spinner 30 three different times to match the color 22 on the card 16 with the color 22 on the spinner 30. The determination of how many spins of the spinner 30 may be used may be based upon the age and ability of the people playing the game 10. If the color 22 on the card 16 and the color 22 on the spinner 30 do not match, then the player puts the card 16 into the other retaining mechanism 38 on the gameboard 36. Once there is more than one card 16 in each retaining mechanism 38, the players can choose one card 16 from either retaining mechanism 38 on the gameboard 36. Placing the cards 16 in the retaining mechanism 38 and/or the holder 48 can help people learn to move through different emotions 14, learn from the emotion 14, and feel more comfortable with different emotions 14.

If the player selects the card 16 that is a "lose a turn" card 16 then the player will lose their turn and place the card into one retaining mechanism 38. When the player fills at least three of the four slots 50 corresponding to one category 24 in their holder 48, then the player gets to retrieve the spinner 30 for that category 24 from the gameboard 36 and places the spinner 30 next to their holder 48 or on their holder 48. Alternatively, if one player has three cards 16 corresponding to one category 24 in the holder 48 and another player has one card 16 corresponding to the same category 24 in his/her holder 48, then the two players may have a spin-off. In one exemplary spin-off, the first player to spin the spinner 30 and land on the yellow color will win the spinner 30. The spin-off may also occur where two players playing the game 10 each have two cards 16 corresponding to one particular category 24, then the spin-off may be used to determine who wins the particular spinner 30. The rules of the game 10 may include different numbers of cards 16 in each category 24 to determine whether the spin-off may be appropriate to determine who wins the spinner 30. In the end, depending upon how many players are participating in the game 10, the player with the most spinners 30 is the winner. If each player has the same number of spinners 30 once all the spinners 30 have been won by the players, then the players will have a spin-off and the first player to land on yellow may win the game. In the spinoff one player spins and the spinner 30, then another player spins the spinner 30.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A game for assessing and developing emotional intelligence comprising:
a plurality of cards, each card including at least one image of a plurality of images, the at least one image corresponding to a predetermined emotional situation and at least one spinner of a plurality of spinners, each spinner from the plurality of spinners including:
a first upper portion displaying an image of the plurality of images, the first upper portion being configured to initiate rotation of each spinner, the image of the first upper portion corresponding to the at least one image of a selected card from the plurality of cards; and
a second lower portion disposed circumferentially around the first upper portion, the second lower portion having a plurality of colors, each color from the plurality of colors corresponding to one emotion from a plurality of emotions, the first upper portion protruding distally away from the second lower portion.

2. The game of claim 1, wherein each of the plurality of spinners is configured to be activated to randomly correspond to one emotion.

3. The game of claim 2, wherein the plurality of colors are red, yellow, green and blue.

4. The game of claim 3, further comprising a gameboard, the gameboard being configured to releasably receive the plurality of spinners.

5. The game of claim 4, wherein the gameboard is an anthropomorphic shape.

6. The game of claim 5, further comprising at least one retaining mechanism, the at least one retaining mechanism being configured to retain the plurality of cards.

7. The game of claim 6, comprising two retaining mechanisms, the gameboard being configured to receive the two retaining mechanisms.

8. The game of claim 7, further comprising at least two holders, the at least two holders being configured to receive the plurality of cards.

9. The game of claim 8, wherein each holder includes a plurality of slots, each slot being configured to releasably retain at least one card from the plurality of cards.

10. The game of claim 9, wherein each holder includes at least twenty-four slots.

11. The game of claim 9, wherein the gameboard is configured to receive the at least two holders.

12. The game of claim 4, wherein the gameboard further includes a projection, the projection having a proximal end and a distal end opposite the proximal end, the proximal end being secured to an outer surface of the gameboard.

13. The game of claim 4, wherein the gameboard further includes at least one indentation defined by an outer surface of the gameboard, each indentation is configured to retain one spinner from the plurality of spinners.

14. The game of claim 1, wherein the plurality of emotions includes at least one from the group consisting of relaxed, happy, sad, and angry.

15. A game for assessing and developing emotional intelligence comprising:
a gameboard having an anthropomorphic shape;
a plurality of cards, each card including at least one image of a plurality of images, the at least one image corresponding to a predetermined emotional situation;
a plurality of spinners, each spinner having:
a first upper portion displaying an image of the plurality of images, the first upper portion being configured to initiate rotation of each spinner, the image of the first upper portion corresponding to the at least one image of a selected card from the plurality of cards; and
a second lower portion disposed circumferentially around the first upper portion, the first upper portion protruding distally away from the second lower portion, the second lower portion having a plurality of colors wherein each color is configured to correspond to at least one emotion, each spinner being configured to be releasably secured to the gameboard;
at least one retaining mechanism, the gameboard being configured to receive the at least one retaining mechanism, each retaining mechanism being sized to receive the plurality of cards; and
at least two holders, each holder including a plurality of slots, each slot being configured to releasably retain at least one card from the plurality of cards.

16. The game of claim 15, wherein the gameboard further includes at least one indicator proximate to each spinner from the plurality of spinners and wherein the at least one indicator is configured to identify one color from the plurality of colors.

17. The game of claim 16, wherein the gameboard further includes a projection, the projection having a proximal end and a distal end opposite the proximal end, the proximal end being secured to an outer surface of the gameboard.

18. A method of stimulating conversation about at least one emotion comprising the steps of:
selecting at least one card from a plurality of cards, each card including at least one image of a plurality of images and at least one color of a plurality of colors;
matching the at least one image of the at least one card to at least one spinner of a plurality of spinners having an image corresponding to the at least one image of the at least one card, the at least one spinner having:
a first upper portion displaying the image, the first upper portion being configured to initiate rotation of the at least one spinner; and
a second lower portion disposed around the first upper portion, the second lower portion having the plurality of colors;
rotating the at least one spinner to select a color from the plurality of colors;
determining whether the color selected by the at least one spinner matches the at least one color of the selected at least one card; and
positioning the selected at least one card on a corresponding slot of a holder based on the color selected by the at least one spinner.

19. The game of claim 1, further including at least one indicator proximate to each spinner of the plurality of spinners and wherein the at least one indicator is configured to identify one color from the plurality of colors.

20. The game of claim 1, wherein the plurality of spinners includes six spinners.

* * * * *